United States Patent [19]

Kollross

[11] 4,200,960
[45] May 6, 1980

[54] METHOD AND APPARATUS FOR SHIRRING OF SYNTHETIC TUBES, PARTICULARLY CASINGS FOR SAUSAGE PRODUCTION

[76] Inventor: Gunter Kollross, Wallerstadter weg 20, 6081 Dornheim, Fed. Rep. of Germany

[21] Appl. No.: 842,353

[22] Filed: Oct. 14, 1977

[30] Foreign Application Priority Data

Oct. 16, 1976 [DE] Fed. Rep. of Germany ....... 2646848

[51] Int. Cl.² ............................................. A22C 13/02
[52] U.S. Cl. ......................................... 17/42; 17/1 F
[58] Field of Search .................. 17/41, 42, 49, 35, 1 F

[56] References Cited

U.S. PATENT DOCUMENTS

| | | | |
|---|---|---|---|
| 2,983,949 | 5/1961 | Matecki | 17/42 |
| 3,266,911 | 8/1966 | Clement | 17/42 X |
| 3,310,833 | 3/1967 | Clement | 17/42 |
| 3,594,857 | 7/1971 | Michl | 17/42 |
| 4,085,483 | 4/1978 | Winkler | 17/42 |

*Primary Examiner*—Willie G. Abercrombie
*Attorney, Agent, or Firm*—McGlew and Tuttle

[57] ABSTRACT

A method for the shirring of synthetic tubes or casings comprising inflating the casing, inserting a long guide element of comparatively low gyrating cross-section into the casing while it remains inflated, applying pressure to the casing with a plurality of shirring elements engaging around its circumference in the same axial range, and gyrating the shirring elements in an eccentric pattern around the center of the guide element to effect gripping and carrying of the casing axially against a control-retracting buffer on the axial fold formation through which the casing is folded in a spiral shape. A device for shirring of the sausage casing comprises a guide mandrel over which the casing is fed through a shirring head which includes a plurality of rotatable profile rollers carried on the head and arranged radially in respect to the guide mandrel at spaced circumferential locations around the mandrel. The device also includes first and second rotating shafts having eccentric portions connected to the shirring head so as to cause gyration of the shirring head and a gyratory movement of the profile rollers around the casings to fold the casings in a spiral shape.

8 Claims, 3 Drawing Figures

METHOD AND APPARATUS FOR SHIRRING OF SYNTHETIC TUBES, PARTICULARLY CASINGS FOR SAUSAGE PRODUCTION

FIELD AND BACKGROUND OF THE INVENTION

This invention relates in general to a method and apparatus for forming casings or tubes and, in particular, to a new and useful method and apparatus for forming sausage casings and particularly for forming the casings into a spiral shape with the use of a shirring head having radially arranged profile rollers which are gyrated in a path around a concentric guide for the casing.

DESCRIPTION OF THE PRIOR ART

The invention refers to a method and a device for the bellows-type shirring of synthetic casings, in particular, artificial casings for use in sausage production, in which the casing, interspersed by a long guide element of relatively low gyrating cross-section, is pushed together in an axial direction by means of shirring elements applied at its circumference in the same axial section and the casing is then gripped while it is inflated. The shirring elements move to transport the casing axially against a controlled yielding buffer to effect the formation of folds.

During shirring of artificial casings, there exists the special problem of laying the casing in folds running transversely over its length, which remain constant in cross-section, in such a manner that subject to maintenance of a specific clear width in the interior of the shirred casing, air pockets between the folds are avoided to the greatest possible extent. It is desirable to obtain maximum compaction, that the fold backs formed by the shirring be made stable in order to prevent independent disintegration during further processing. Herein, the casing to be shirred distinguishes itself from a concertina, whose width in an axial direction changes constantly, whereby, the number and position of the folds are prescribed from the initial stages of forming.

In order to combat the manufacturing problems which exist, various methods and devices have already been proposed. All of these methods and devices have in common the use of a long guide element through the casing with a relatively narrow gyrating cross-section, which is usually formed from a taper bore mounted mandrel. The casing is pushed together in an axial direction on the mandrel by means of shirring elements applied at its circumference which grip in the same axial section, and transport the casing axially, against a controlled yielding buffer, to effect the formation of folds.

In order to achieve a certain orderliness in the formation of folds, it has also been proposed (U.S. Pat. Nos. 3,594,857 and 3,619,845), that a torsional or rotary movement be carried out between the guide element (mandrel) and the shirring element. The guide element is principally in the form of sectioned rollers which are engaged on the casing so as to form folds. By means of this measure, a certain orderliness is introduced to the fold formation, but fold formation of a type which ensures that the radial distance available between the mandrel and the full width of the casing by the folds staggered axially to each other respectively over a limited range is fully exploited, is not possible, however.

Another method (U.S. Pat. No. 3,266,911) prefers that the casing is pushed forward on the mandrel between three evenly cogged shirring rollers, the cogs of which are formed in the same manner as those of a worm wheel. In this case, the crests of the teeth meeting simultaneously on the mandrel form themselves into an out of center opening cross-section, which moves further from tooth to tooth by 120° in the circumferential direction and thereby leads to a fold formation with a spiralled outer circumference which is larger than the circumference of the unshirred casing.

Since the volume available for shirring is increased a particularly great amount, a great length of casing material can be shirred by comparison to other methods. However, the casing is subjected to considerable stress between the toothed rollers which is undesirable due to the danger of damage. Apart from this, this known method requires an exchange of shirring rollers upon change over to other casing cross-sections which should preferably be avoided, so as to keep the shutdown times at a minimum.

SUMMARY OF THE INVENTION

The inventive method and device provides maximum shirring of the casing into a stable fold formation with careful treatment of the casing material.

In accordance with the invention, the shirring elements, while kept in their positions relative to each other, are brought into conformable circular motions about axes which are parallel to the guide element, in a manner such that the center of the passageway for the casing, surrounded by the shirring elements, rotates about the axis of the guide element.

The invention starts from the consideration that with a casing having a constant diameter in the axial direction, a closed, circumferentially extending, fold, such as in a tubular bellows, cannot be formed, but that this difficulty can be surmounted by forming a plurality of consecutive partial folds which are distributed over the circumference and slightly offset relative to each other in the axial direction. While applying the inventive method, these partial folds are formed radially to a depth which fully corresponds to the radial spacing between the guide element and the circumference of the unshirred casing, whereby the cross-sectional area available for shirring is optimally utilized and, at the same time, a great stability of shape is obtained.

A known device (U.S. Pat. No. 3,594,857) includes a taper bore mounted tube-shaped mandrel and a controlled axially mobile shirring head in ratio to the same, which is formed by at least two, and preferably three, profiled rollers driven in synchronism, with the casing, which is sealed by squeezing rollers in front of the mandrel and thereupon shirred by the profiled rollers against a stop provided at the clamping end of the mandrel, being inflated to its full circular cross section with air introduced through the mandrel, and the circumferences of the profile rollers being radially spaced from the circumferential surface of the mandrel, the inventive method can be applied with particular advantage by providing that the shirring head is mounted on at least two parallel eccentric shafts by which it is drivable for rotary motion about the axis of the mandrel. It may further be advantageous to drive the profiled rollers at a circumferential speed which is substantially higher than the selective speed between the mandrel and the shirring head.

In order to adjust the device according to the invention to the various casing widths and materials, a separate drive with adjustable speed is provided in accordance with a feature of the invention for the rotating movement of the shirring head. For this purpose, a regulated DC motor is used.

It is further of advantage that the eccentricity for the rotating movement of the shirring head be adjustable, for which purpose rotatable and arrestable eccentric bushes can be arranged between each eccentric shaft and the shirring head in relationship to the eccentric shaft. Such adjustability provides optimum results even with various casing diameters and materials.

A flexible material such as expanded isocyanate polyester is selected as the most logical material for the profile rollers and the profile rollers are preferably toothed at the circumference.

Accordingly, it is an object of the invention to provide an improved method for forming casings, particularly sausage casings, which comprises inflating the casing and inserting a long guide element through the casing and applying pressure to the casing with a plurality of shirring elements which are arranged around the circumference and which are gyrated about an eccentric path in respect to the guide so as to engage the casing and form it in a spiral shape.

A further object of the invention is to provide a device for shirring of tubular elements, such as sausage casings, which comprises a guide over which the casing is positioned and a shirring head positioned around the guide which includes a plurality of radially arranged profile rollers distributed around the circumference of the guide which are gyrated by an eccentric drive so as to grip the casing walls as it is advanced off the mandrel and forming it into a spiral shape.

A further object of the invention is to provide a device for shirring of synthetic tubes, particularly casings for sausage production, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there is illustrated a preferred embodiment of the invention.

DESCRIPTION OF THE PREFERRED EMBODIMENT

Figure 1:
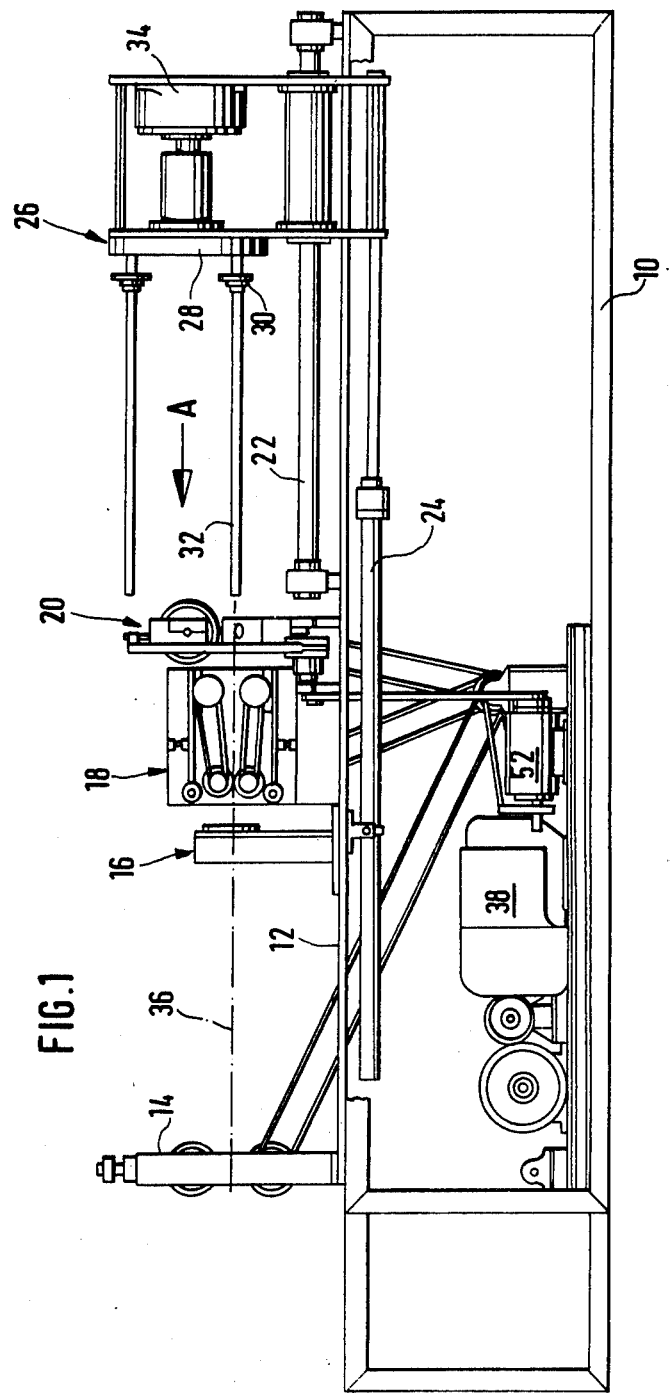
FIG. 1 is a schematic side elevational view of a shirring device for sausage casings constructed in accordance with the invention.

Referring to the drawings in particular, the invention embodied therein, comprises a device for shirring of sausage casings which includes a guide mandrel or hollow tube 32 over which the casing is positioned before it is moved into association with the shirring head 20.

The shirring device shown in FIG. 1 consists of a frame 10 with a partially hollowed-out bench 12, upon which a squeeze roller unit 14, a pressing unit 16, a conveyor device 18, a roller head 20 and a pair of guide rods 22 (only one rod is visible), are arranged in order. A power cylinder 24 is longitudinally slidable on the guide rods 22 and is connected to a revolving head unit 26. The revolving head unit 26 includes a revolving disc 28 which carries four detachable guide elements or tube-shaped mandrels 32, each fitted with buffer discs 30. In the retracted position of the revolving head unit 26 shown, the mandrels 32 are drawn out of the roller head 20. Mandrels 32 can be switched into a forward final position by the power cylinder 24 in which they extend through the roller head 20 and through the conveyor device 18, which serves as the initial position for the shirring of a casing length.

The synthetic casing to be shirred is fed along an axis 36 from a storage reel (not shown) at the left end of the frame 10 through the squeeze roller unit 14 and the pressing unit 16 onto a respective mandrel 32 and it is led by conveyor unit 18 to roller head 20. Head 20 lays the casing in folds, in the manner described below, and shirs this together in the shape of a concertina on the mandrel 32 against the buffer 30, all as controlled by the revolving head unit 26. Squeeze rollers 14a and 14b in unit 14, the conveyor rollers 18a and 18b in unit 18 and the rollers of the roller head 20 are driven by V-belt drives by a DC motor 38 located in the lower part of frame 10, which is coupled to the drive shaft by means of a geared magnetic coupling and its speed is regulatable. Further air is blown by a compressor or inflating means 34, through each mandrel 32 when it is in an operating position for inflation of the casing in the pressing section 16 and the conveyor section 18 and, in particular, in the roller head 20, to the squeezer rollers 14, which effects sealing.

Figure 2:
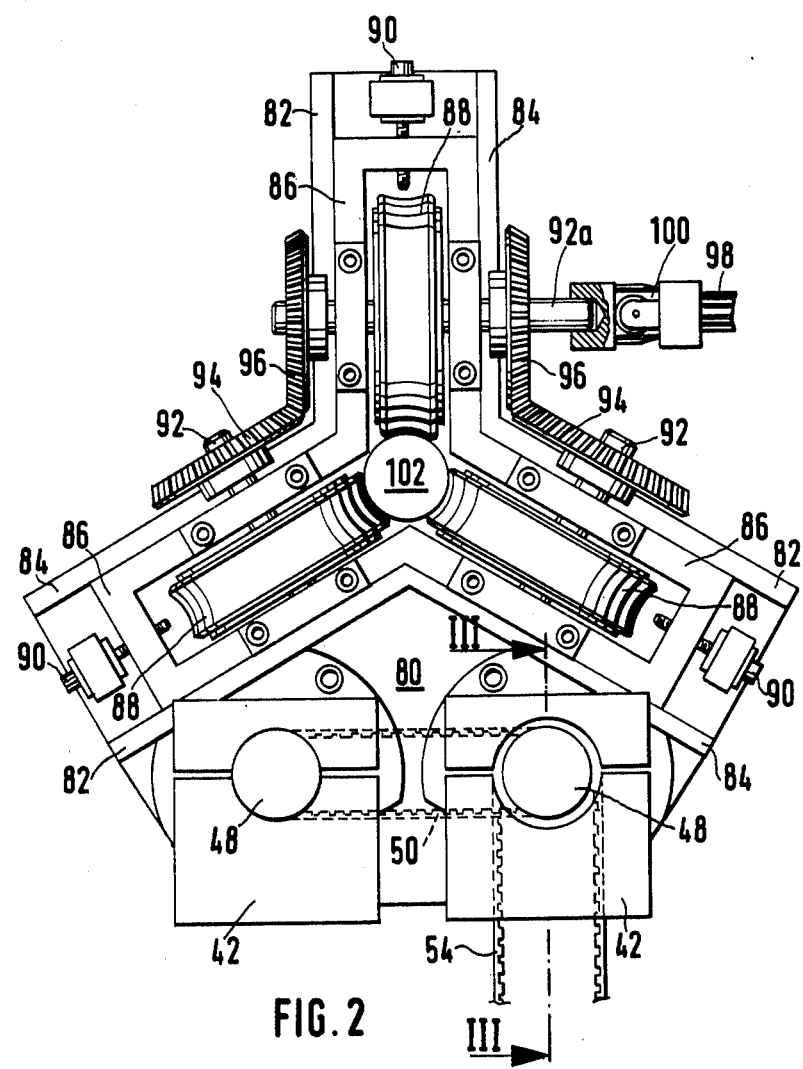
FIG. 2 is an enlarged rear elevational view of the front section of the roller head in the direction of arrow A in FIG. 1.
Figure 3:
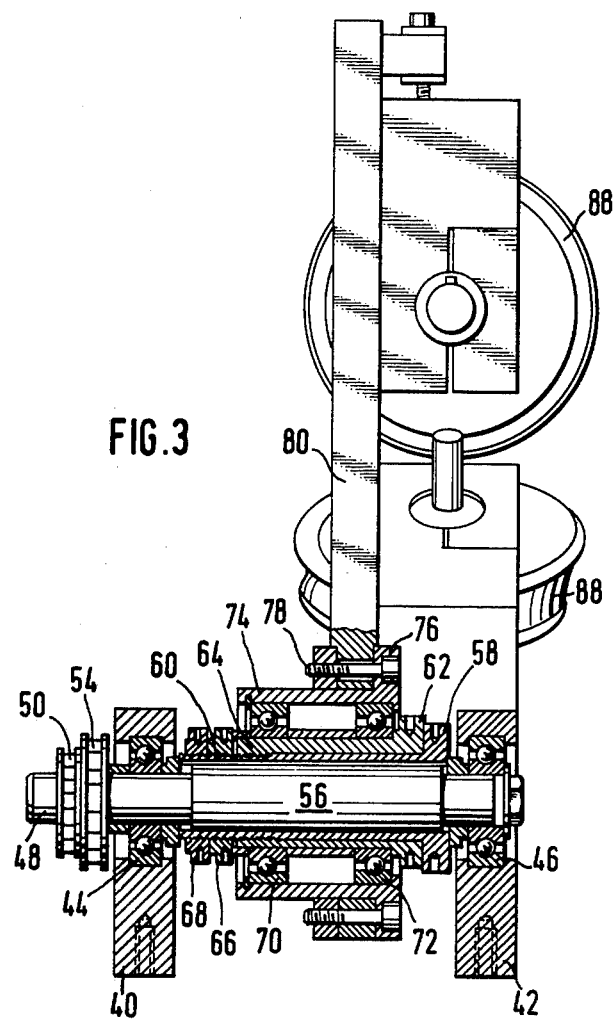
FIG. 3 is a side view of the roller head, partially in section, taken along the lines III—III in FIG. 2.

The design of the shirring head and its bearings on the frame 10 can be seen in detail in FIGS. 2 and 3. As these figures indicate, two pairs of pillow blocks 40 and 42 are fixed on the bench 12, in each one of which eccentric shaft 48 is supported on ball bearings 44 and 46, respectively. The two eccentric shafts 48, 48 are coupled with each other in synchronized operation through a toothed belt drive 50 and are driven by a DC motor 52 arranged in the lower part of the frame 10, regulatable and fitted with magnetic coupling over a further toothed belt drive 54.

Each eccentric shaft 48 has a strengthened section 56 on which an eccentric bush 60 is arranged which is provided with torsional strength and is axially fixed on a flange 58. At the free end of the eccentric bush 60, an eccentric sleeve 64 with a threaded outer side is arranged with a flange 62, which after loosening of a nut 66 and a lock-nut can be turned opposite the eccentric bush 60. The eccentricities of the bore and the outside circumference of the eccentric bush 60 and the eccentric sleeve 64 are equal, so that by means of relative torsion between bush and sleeve, the eccentricity of the outside of the eccentric sleeve 64 towards the eccentric shift 48 can be adjusted between zero and the double value of the eccentricity of the bush or sleeve, respectively.

A flange nub 74 is seated above ball bearings 70 and 72 on a respective eccentric sleeve 64, to be set respectively at the same eccentricity of the two eccentric shafts 48, 48. The flange 76, with the aid of screws 78 is screwed to a baseplate 80.

Baseplate 80 is a slit star-shaped assembly which is fitted at intervals on both sides of the slits meeting in the center of the star with flanges 82 and 84, between which fork-shaped pillow blocks 86 for each shirring roll 88 are displaceable radially in respect to the star center and adjustable by means of thread setting device 90. The shirring rollers 88 are firmly arranged on extended shafts 92, which are firmly connected to each other by pairs of bevelled gears 94 and 96. The upper shaft 92a carries two bevelled gears 96, which are driven through an extendible intermediate shaft 98, and universal joints arranged on both sides of the shaft by the regulated DC motor 38. In FIG. 2, only the shaft 92a is shown.

The shirring rollers 88 are of a flexible material, for instance, expanded isocyanate polyester, and are preferably toothed or knurled at their circumference in order to ensure a better gripping of the casing to be shirred and to ensure fold formation between the teeth.

Depending on the set eccentricity of the outside area of eccentric sleeve 64, the shirring head which is driven by the DC motor 52 over the toothed belt drives 54 engages with the cyclic profile 102 (FIG. 2) which corresponds with the outside circumference of the inflated casing to be shirred. The profile 102 is surrounded by the three shirring rollers 88 which carry out a gripping movement around the axis eccentrically positioned in respect to the mandrel 32. The engagement path goes through the rollers and extends inside the casing. The eccentric speed can amount to 800 to 1,000 rpm, and is chosen in such a way that in connection with the simultaneous pushing forward of the casing by the shirring rollers 88, a spiralled continuous fold formation of the casing is formed on the mandrel 32 and, at the same time, pressure against the buffer disc 20 or the material in front of that which is already shirred, takes place.

The described device can be automated in such a way that after reaching a certain length, the magnetic coupling of the motors 38 and 52 can be released by means of a contact activated by the returning revolving head unit 26, whereupon, the revolving head retracts completely and switches further. By means of renewed forward drive of the revolving head, a new mandrel 32 is led into the cut casing end, and the magnetic coupling of the motors 38 and 52 are re-engaged after reaching the front end position of the revolving head unit, whereupon, a new shirring cycle begins.

While a specific embodiment of the invention has been shown and described in detail to illustrate the application of the principles of the invention, it will be understood that the invention may be embodied otherwise without departing from such principles.

What is claimed is:

1. A device for the shirring of casings, particularly sausage casings, comprising a guide mandrel over which the casing is fed, first and second rotating shafts having eccentric portions, a shirring head supported on said eccentric portions of said shafts for oscillation thereby during rotation of said shafts, at least two rotatable profile rollers carried on said shearing head having peripheries disposed radially in respect to said guide mandrel at spaced locations around said guide mandrel, means for inflating the casing, means for drawing off the casing from said mandrel, and means for rotating said shafts to cause gyration of said profile rollers around said casing to feed the casing in a spiral shape off said guide mandrel.

2. A device for the shirring of casings, according to claim 1, wherein said means for rotating said shafts comprises a separate variable speed drive motor connected to said shafts for rotating said shafts.

3. A device for the shirring of casings, according to claim 1, wherein said means for rotating said shafts is separate from the means for drawing off said casing from said mandrel and comprises a control DC motor.

4. A device for the shirring of casings, according to claim 1, wherein said first and second eccentric shaft portions comprise adjustable eccentrics.

5. A device for the shirring of casings, according to claim 4, wherein said eccentrics each comprise an eccentric sleeve positionable over each of said shafts and being rotatable thereon and an eccentric tubular member over said sleeve which is revolvable in respect to both said shaft and said sleeve for providing a double eccentric accumulation.

6. A device for the shirring of casings, according to claim 1, wherein said at least two profile rollers are comprised of an expanded isocyanate-polyester material.

7. A device for the shirring of casings, according to claim 1, wherein said at least two profile rollers have toothed formations around their peripheries.

8. A device for the shirring of casings, according to claim 1, wherein said at least two rotatable profile rollers comprise three concentrically arranged rollers positioned around said guide member, first and second pillow block portions supporting two of said respective first and second ones of said three rollers, the other of said rollers being centrally disposed between the other two rollers, said eccentric shaft portions being connected to said first and second pillow blocks.

* * * * *